UNITED STATES PATENT OFFICE 2,224,856

β,γ-UNSATURATED KETONES OF THE CYCLOPENTANO POLYHYDRO PHENANTHRENE SERIES AND METHOD OF PRODUCING THE SAME

Adolf Butenandt, Berlin-Lichterfelde, Germany, assignor to Schering Corporation, Bloomfield, N. J., a corporation of New Jersey No Drawing. Application March 25, 1937, Serial No. 132,954. In Germany March 31, 1936

12 Claims. (Cl. 260—397)

This invention relates to the production of β,γ-unsaturated ketones of the cyclopentano dimethyl polyhdro. phenanthrene series, and more especially of β,γ-unsaturated ketones of the cyclopentano polyhdro phenanthrene series of the general formula $C_{19}H_{26}O(X)$ and the constitutional formula

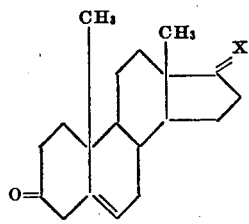

in which X indicates

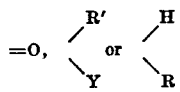

Y being a hydroxyl group or a group convertible by hydrolysis into the hydroxyl group, as, for example, an ester or ether group or the like, R' hydrogen or a hydrocarbon radical and R any suitable substituted or non-substituted hydrocarbon residue, and to the method of producing the same. In particular the present invention is concerned with a process for the manufacture of Δ5-androstendione-(3,17) of the formula $C_{19}H_{26}O_2$ or Δ5-androstenol-17-one-(3) of the formula $C_{19}H_{28}O_2$ and with a process for the manufacture of β,γ-unsaturated ketones of the pregnane series and also of the sterol and bile acid series.

The process of manufacture according to the invention consists in subjecting, for example, β,γ-dihalogenated ketones of the cyclopentano polyhydro phenanthrene series of the general formula $C_{19}H_{26}(Hlg)_2O(X)$ and the constitutional formula

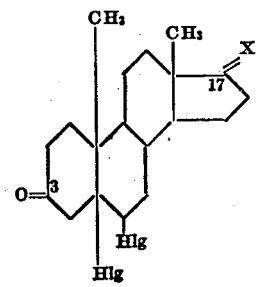

in which Hlg stands for halogen and X for

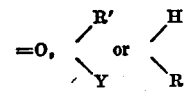

Y, R' and R having the same significance as above, to a dehalogenating treatment under mild, that is, neutral conditions, for example, by means of zinc in a neutral medium or other dehalogenating agent which remains substantially neutral during the dehalogenation.

Whereas in the case of the hitherto customary dehalogenation in acid or alkaline medium of β,γ-dihalogenated ketones with simultaneous isomerisation the corresponding α,β-unsaturated ketones are formed, in the case of the dehalogenation of the β,γ-dihalogenated ketones according to the present invention under mild conditions, for example, by means of zinc in a neutral medium, there is no displacement of the carbon-carbon double bond from the β,γ-position into the α,β-position; it is possible in this manner to produce hitherto unknown β,γ-unsaturated ketones of the cyclopentano polyhydro phenanthrene series.

As neutral medium for the dehalogenation of the β,γ-dihalogenated ketones usually carried out with zinc dust or the like, are suitable in particular alcoholic solvents such as methanol, ethanol and so on; there can obviously, however, also be employed other solvents reacting essentially neutral, as, for example, acetone or the like.

The β,γ-dihalogenated compounds of the cyclopentano polyhydro phenanthrene series containing keto groups coming into consideration as starting materials for the present process can be obtained in any suitable manner. They can, for example, be obtained by adding halogen to cyclopentano polyhydro phenanthrene compounds of the type initially mentioned, which contain on the carbon atom 3 a secondary alcohol group and in β,γ-position thereto, that is to say therefore between the carbon atoms 5 and 6, a double bond, and thereupon converting the dihalogenated secondary alcohols formed, by treatment with suitable oxidising agents, into the corresponding β,γ-dihalogenated ketones. Various of the β,γ-dihalogenated ketones serving for carrying out the process of the invention can be formed, for example, by a suitable degradation of such β,γ-dihalogenated ketones as possess on the carbon atom 17 a side chain capable of being degraded.

It is to be recommended likewise to employ as solvents for the recrystallisation of the β,γ-unsaturated ketones obtained according to the invention essentially neutrally reacting media.

The β,γ-unsaturated ketones of the cylopentano polyhydro phenanthrene series obtainable according to the present process constitute valuable compounds; they can be further worked up to substances of great physiological activity and also to some extent themselves already possess a physiological activity.

The following examples serve to illustrate the invention without, however, limiting the same to them:

Example 1

100 mg. of cholestanone dibromide-(5,6), as is obtainable, for example, by oxidation of cholesterol dibromide with chromic acid in glacial acetic acid, are heated in 3 ccs. of ethanol with 100 mg. of analytically pure zinc dust for 15 minutes on the water bath. Thereupon the zinc is filtered off and the solution carefully sprayed with water. The separated $\Delta_5$-cholestenone-(3) indicates after several crystallisations a melting point of 127° C. with preliminary sintering. The yield amounts to about 70 mg.

In carrying out the dehalogenation, instead of in ethanol, in methanol or acetone it is to be recommended that the reaction solution be heated for a longer time, say for 30 to 60 minutes.

The oxime obtained by interaction of $\Delta_5$-cholestenone-(3) with hydroxylamine acetate in alcoholic solution crystallises from alcohol in the form of small needles which exhibit a melting point of 188° C. with decomposition.

Example 2

200 mg. of $\Delta_5$-pregnenol-(3)-one-(20) of melting point 190° C. are dissolved in 15 ccs. of glacial acetic acid and treated drop by drop with a solution of 101 mg of bromine in 5 ccs. of glacial acetic acid corresponding to 2 atoms of halogen per molecule. To the solution which is soon decolorised is added in 7 ccs. of glacial acetic acid the quantity of chromium trioxide coresponding to 3 atoms of available oxygen per mol. The reaction mixture is allowed to stand for 24 hours at room temperature and then treated with about 250 ccs. of water. The precipitated product is dissolved in 10 ccs. of methanol and after the addition of 500 mg. of analytically pure zinc dust is heated to gentle boiling for 30 minutes. After the solution has been freed from zinc dust and somewhat concentrated, by the addition of a little water a well defined crystalline product of melting point 145° to 149° C. is obtained in a yield of 80 mg. By recrystallisation from dilute and pure methanol, from ethanol and finally from acetone the $\Delta_5$-pregnendione-(3,20) is obtained in well formed colorless leaflets of melting point 158° to 160° C., which are relatively difficulty soluble in methanol, ethanol and acetone but easily soluble in chloroform.

The dioxime obtainable from $\Delta_5$-pregnendione-(3,20) by heating for 1 hour with excess of hydroxylamine acetate in alcoholic solution exhibits after recrystallisation from pure and dilute alcohol a melting point of 203° to 205° C. with brown coloration; complete decomposition takes place at 207° C.

Example 3

500 mg. of $\Delta_5$-androstenol,(3)-one-(17) are treated in 20 ccs. of glacial acetic acid with a quantity of bromine corresponding to 1 mol and with a quantity of chromium trioxide in glacial acetic acid corresponding to 2 equivalents of oxygen and maintained for 14 hours in the cold. The reaction product precipitated by the addition of water is heated in 10 ccs. of methanol with 1 gram of zinc dust for ½ hour to gentle boiling. Thereupon the solution is treated with water and extracted with ether, zinc hydroxide, produced by hydrolysis, which has been taken up by ether being removed by extraction with dilute hydrochloric acid. The ethereal solution is evaporated and the residue dissolved in acetone in the hot; on cooling of the acetone solution the $\Delta_5$-androstendione-(3,17) crystallises out; it is obtained by recrystallisation from alcohol in leaflets of melting point 158° C. which sinter from 140° C. The yield amounts to 120 mg.

The $\Delta_5$-androstendione-(3,17) yields a dioxime which commences to decompose at 180° C. and melts at about 205° C.

Example 4

250 mg. of androstendiol-(3,17)-mono-acetate-(17) are dissolved in 50 ccs. of glacial acetic acid, treated with 120.4 mg. of bromine in 15 ccs. of glacial acetic acid and 94 mg. of chromic acid in 25 ccs. of glacial acetic acid and allowed to stand for 15 hours. Thereupon the whole is diluted with water and extracted with ether. The ethereal solution is after washing (with 1 N-caustic soda lye, dilute hydrochloric acid and water) dried over sodium sulphate and evaporated. The residue is heated to boiling in 20 ccs. of methyl alcohol with 500 mg. of zinc dust for 45 minutes. The liquid is then filtered from the zinc, the filtrate evaporated to half and caused to crystallise by spraying with warm water. After recrystallising several times from dilute acetone the $\Delta_5$-androstenolone acetate is obtained in lustrous plates of melting point 147° C. which sinter from 130° C. Yield 100 mg. Optical rotation $$[\alpha]_D^{20} = -30.5°$$

(in alcohol).

The mother liquors obtained in the recrystallisation of the $\Delta_5$-androstenolone acetate from dilute alcohol and dilute acetone are combined, diluted with water and extracted with ether. The residue from the ethereal solution is sublimed in high vacuum. At 130° C. and 0.001 mm. there sublimes a light yellow oil from which by recrystallisation several times from dilute acetone a substance is obtained in feathered needles which commence to sinter consistently in a temperature region of 165° to 170° C. and melt at 180° C. Yield 15 mg.

Physiological evaluation of the $\Delta_5$-androstenol-17-one-3-acetate gave the following result: the examination in the capon comb test according to Butenandt and Tscherning showed that 1 R. U. corresponds to about 135$\gamma$, that is a dose after injection twice causes a growth of the capon comb of about 20% in the surface.

The $\Delta_5$-androstenolone acetate is likewise highly active when applied to the vesicular glands of infantile rats. The unit corresponds to about 50$\gamma$, that is to say that a daily dose of 50$\gamma$ over a period of 8 days brings the vesicular glands of the infantile rats to complete formation and capacity for secretion.

Of course, many changes and variations in the reaction conditions and the like may be made by those skilled in the art in accordance with the principles set forth herein and in the claims annexed hereto.

Thus, for instance, other mildly acting dehalogenating agents, besides zinc dust, which likewise do not liberate free acid, may be used, such as copper-zinc alloy, reduced iron containing copper, magnesium in ethereal solution and the like, and other such inorganic or organic dehalogenating agents capable of acting under neutral conditions, such as are described, for instance, in Houben-Weyl, 3rd edition, vol. 2, p. 363; Berichte der Deutschen Chemischen Gesellschaft, vol. 54, p 610 (1921)2, and elsewhere.

What I claim is:

1. Process for the manufacture of $\beta,\gamma$-unsaturated ketones of the cyclopentano polyhydro phenanthrene series wherein β,γ dihalogenated ketones of the cyclopentano polyhydro phenanthrene series of the general formula $$C_{19}H_{26}(Hlg)_2O(X)$$

and the constitutional formula

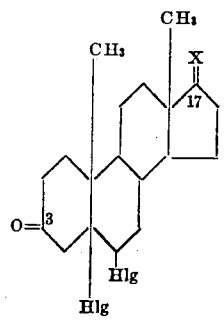

wherein Hlg stands for halogen and X for a member of the group consisting of

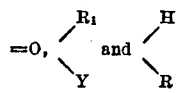

Y being a member of the group consisting of the hydroxyl group and groups that are convertible by hydrolysis into the hydroxyl group, R' a member of the group consisting of hydrogen and hydrocarbon radicals, and R any suitable hydrocarbon radical, are subjected under substantially neutral conditions to the action of a dehalogenating agent capable of splitting off the halogen atoms whereby a double bond is introduced in the 5,6 position.

2. Process as claimed in claim 1 in which the dehalogenation treatment is carried out with a member of the group consisting of zinc and magnesium in a neutral medium.

3. Process for the manufacture of β,γ-unsaturated ketones of the cyclopentano polyhydro phenanthrene series, wherein an androstenone-(3)-dibromide-(5,6) is subjected under substantially neutral conditions to the action of dehalogenating agent capable of splitting off the halogen atoms, whereby a double bond is introduced in the 5,6 position.

4. Process for the manufacture of β,γ-unsaturated ketones of the cyclopentano polyhydro phenanthrene series, wherein an androstandione-(3,17)-dibromide-(5,6) is subjected under substantially neutral conditions to the action of a dehalogenating agent capable of splitting off the halogen atoms, whereby a double bond is introduced in the 5,6 position.

5. Process for the manufacture of β,γ-unsaturated ketones of the cyclopentano polyhydro phenanthrene series, comprising dehalogenating 3-keto-5,6-dibromo cyclopentano polyhydro phenanthrene compounds, by means of zinc in neutral alcoholic solution.

6. β,γ-unsaturated ketones of the cyclopentano polyhydro phenanthrene series of the general formula $C_{19}H_{26}OX$ and the constitutional formula

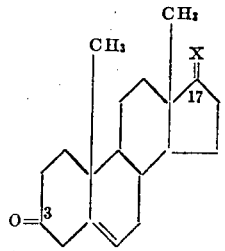

in which X stands for a member of the group consisting of

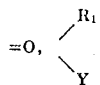

and

Y is a member of the group consisting of hydroxyl group and groups convertible by hydrolysis into the hydroxyl group, R' is a member of the group consisting of hydrogen and hydrocarbon radicals, and R any suitable hydrocarbon radical.

7. β,γ-unsaturated ketones of the cyclopentano dimethyl polyhydro phenanthrene series.

8. β,γ-unsaturated ketones of the androstane series.

9. Δ5-androstendione-(3,17).

10. Δ5-androstenol-17-one-(3).

11. Δ5-androstenol-17-one-(3)-acetate.

12. An ester of Δ5 androstenol-17-one-(3).

ADOLF BUTENANDT.